V. J. WAHLSTROM.
CHUCK.
APPLICATION FILED MAR. 28, 1913.
1,075,174. Patented Oct. 7, 1913.
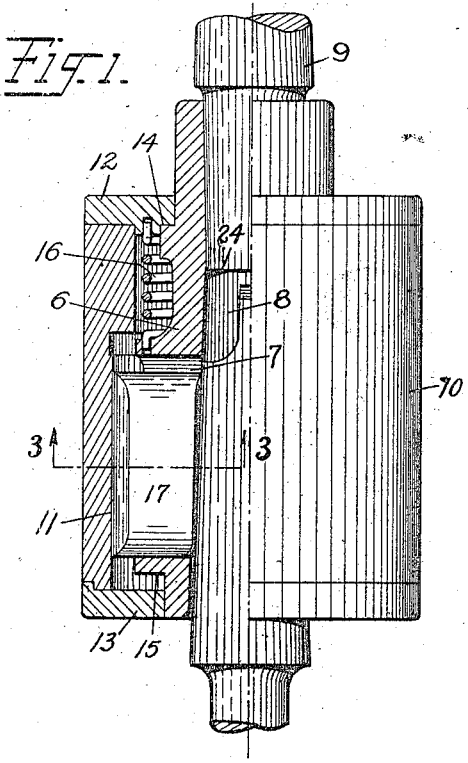
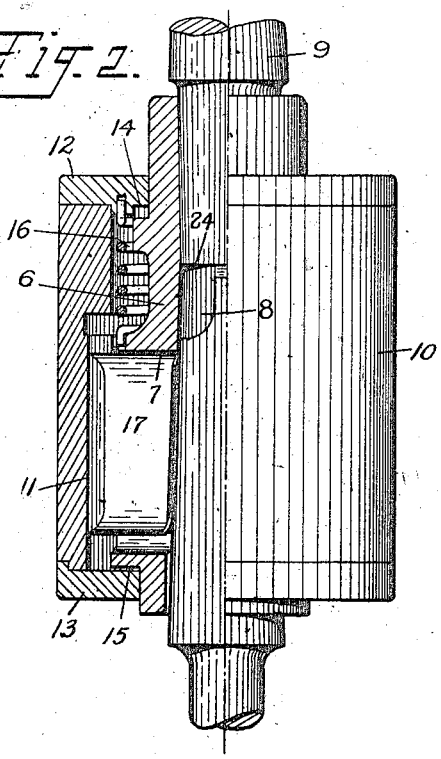
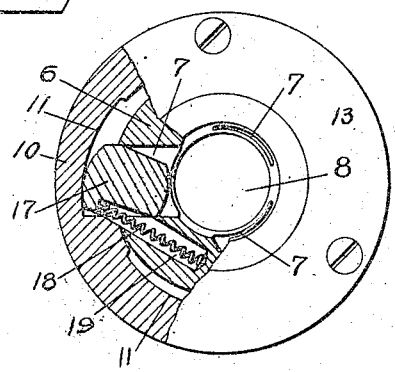
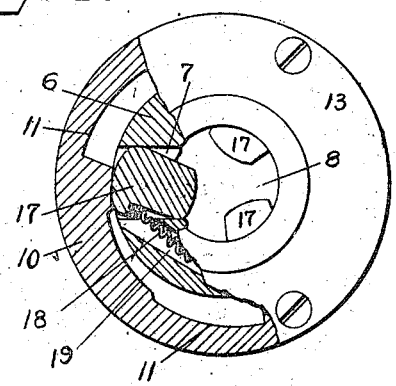
Attest.
Sydney Prescott
Elizabeth Russell
Inventor:
Verner J. Wahlstrom
by Sydney Prescott, Atty.

UNITED STATES PATENT OFFICE.

VERNER J. WAHLSTROM, OF BROOKLYN, NEW YORK, ASSIGNOR TO WAHLSTROM TOOL COMPANY, OF NEW YORK, N. Y., A CORPORATION OF NEW YORK.

CHUCK.

1,075,174.  Specification of Letters Patent.  Patented Oct. 7, 1913.

Application filed March 28, 1913. Serial No. 757,433.

*To all whom it may concern:*

Be it known that I, VERNER J. WAHLSTROM, a citizen of the United States, residing at Brooklyn, county of Kings, and State of New York, have invented a new and useful Improvement in Chucks, of which the following is a specification.

This invention relates to an improvement in chucks of the known type wherein there is employed a spring pressed rotary member operable by hand against the action of its spring while the chuck it rotating and having cam surfaces for operating the jaws to clamp a tool shank, and it has for its main object the production of a device of this kind provided with tapered jaws for engaging tapered tool shanks and with means for preventing a tapered tool shank from wedging the jaws against the cam surfaces with a force sufficient to prevent hand operation of that part of the chuck which controls the movement of the jaws.

A further object is the production of simplified clamping jaws having one edge rounded for direct contact with the rotary member of the chuck and having its opposite edge shaped to form an eccentric cam surface adapted to firmly grip a tool shank, the gripping action being produced by a rocking movement of the jaw.

With these and other objects not specifically mentioned in view, the invention consists in certain constructions and combinations which will be hereinafter fully described and then specifically set forth in the claims hereunto appended.

In the accompanying drawings, which form a part of this specification and in which like characters of reference indicate the same or like parts, Figure 1 is a half sectional view of a device constructed in accordance with the invention and illustrating the relative positions of the parts when the tapered tool shank is first inserted in the chuck; Fig. 2 is a corresponding view but illustrating the parts in the position they occupy when the tool is under pressure, as for instance when driven; Fig. 3 is a broken sectional view taken on the line 3—3 in Fig. 1; and Fig. 4 is a view taken on the same line in Fig. 1 but showing the parts in different positions.

In the device selected to illustrate the invention, there is provided a body 6 having three radial slots 7 cut through its walls and opening into a tapered central aperture 8 adapted to receive a tapered tool shank. The body is further provided with a shank 9, driven or otherwise fastened therein, for the purpose of attaching the device to a drill press or other machine tool. The device is further provided with an annular shell 10 surrounding the body, and rotatably and axially movable thereon. This shell is provided with three internal cam surfaces 11, and is held in position by means of two caps 12 and 13 screwed or otherwise fastened to the shell 10. These caps 12 and 13 are adapted to respectively engage rabbets 14 and 15 formed on the body 6, the rabbets being spaced apart a sufficient distance to permit a relative longitudinal movement of the shell and body. A torsion spring 16 is coiled around the body within the shell, one end being fast to the body and the other to the shell as is clearly shown in Fig. 1.

For the purpose of clamping the tool in the central aperture 8 there is provided a plurality of tapered jaws 17, one of which works in each slot 7. The outer edge of each jaw is rounded and contacts with one of the internal cam surfaces 11 before referred to. The inner edge of each jaw is shaped to form an eccentric cam surface adapted to firmly grip a tool shank in the central aperture 8 when brought into contact therewith, the gripping action being produced by a rocking movement of the jaw within its slot, which movement is set up by the resistance of the tool to the turning action of the chuck. Each of the jaws 17 is held against its coöperating cam surface 11 by the action of a spring 18 which engages said jaw and is partially housed in a bore 19 formed in the chuck body 6, as clearly shown in Fig. 3. The function of this spring is to force the jaw outwardly against the cam surface 11 and to rock the jaw in a reverse direction after a tool shank has been released to return said jaw to its normal position, or that shown in Fig. 3. These springs serve to normally hold the jaws in the position shown in Fig. 3 and when a tool is engaged by the jaws and the jaws are thereby rocked, the spring is buckled in its housing, the bore of which is large enough to permit this action. It will be noted that the jaws are somewhat shorter than the slot 7 so that they are free to move therein not only radially but axially, or along the axis of the chuck.

When no tool shank is in the chuck, the parts occupy the positions shown in Fig. 4 and when a tapered tool shank is inserted in the central aperture 8, it contacts with the long operating faces of the jaws. It is to be understood that the tool shank is inserted in the chuck while the latter is rotating in the drill press or other machine tool, and that to open the jaws and permit the insertion of the tool shank, it is necessary only to seize the shell 10 and operate it by hand against the action of the spring 16 as in the earlier chucks of this type. After a tapered tool shank has been inserted in the central aperture and the shell released, the spring then operates the shell to force the jaws inwardly to clamp the tool shank against slippage during the rotation of the chuck. It has been found, however, that tapered jaws and a tapered tool shank cannot be used in chucks of a similar type heretofore known for the reason that when the operating pressure is brought upon the tool for drilling or other work, the tapered shank of the tool wedges the jaws against the cam surfaces with force sufficient to prevent the hand operation of the shell. It will be readily understood by an inspection of Figs. 1 and 2, that the shell is not only rotatable upon the body of the chuck but is axially movable thereon and that the jaws are not only radially movable in the slots but are also axially movable therein. When pressure is brought upon the drill or other tool in the chuck, the tapered shank of the tool retreats in the aperture, carrying with it the jaws and the shell or rotary member surrounding the body portion of the chuck. This retreating movement continues until the extreme end of the tool shank strikes an abutment 24 carried by the chuck body and located at the inner end of the central aperture. It will be understood by an inspection of Fig. 2 that the end of the tool shank strikes the abutment before the jaws and the outer shell have reached the limit of their axial movement. After the tool shank reaches the abutment, the pressure is transferred to said abutment and the jaws are not subjected to the wedging action occuring in the older chucks.

Changes and variations within the scope of the appended claims may be made in the structure by means of which the invention is carried into effect. The invention therefore is not to be restricted to the precise details of the structure shown and described.

What is claimed is:

1. In a rotating chuck for tapered tool shanks, the combination with movable tapered jaws, of a spring pressed rotary member operable by hand against the action of its spring while the chuck is rotating and having cam surfaces for operating the jaws to clamp a tool shank, and means for limiting relative axial movement of the chuck and a tool shank clamped therein to prevent the tapered shank under operating pressure from wedging the jaws against the cam surfaces with force sufficient to prevent hand operation of said member.

2. In a rotating chuck for tapered tool shanks, the combination with radially movable tapered jaws, of a spring pressed rotary member operable by hand against the action of its spring while the chuck is rotating and having cam surfaces for operating the jaws to clamp a tool shank, and an abutment carried by the chuck for limiting relative axial movement of the chuck and a tool shank clamped therein and resting against the abutment to prevent the tapered shank under operating pressure from wedging the jaws against the cam surfaces with force sufficient to prevent hand operation of said member.

3. In a rotating chuck for tapered tool shanks, the combination with radially and axially movable tapered jaws, of a spring pressed rotary member operable by hand against the action of its spring while the chuck is rotating and having cam surfaces for operating the jaws to clamp a tool shank, and an abutment carried by the chuck for limiting relative axial movement of the chuck and a tool shank and the jaws clamping the latter to prevent the tapered shank under operating pressure from wedging the jaws against the cam surfaces with force sufficient to prevent hand operation of said member.

4. In a rotating chuck for tapered tool shanks, the combination with a chuck body having radial slots opening into a central aperture, of jaws shorter than and radially and axially movable in said slots, a spring pressed rotary member surrounding the chuck body and operable by hand against the action of its spring while the chuck is rotating and having cam surfaces for operating the jaws to clamp a tool shank, and an abutment at the inner end of the central aperture for limiting relative axial movement of the chuck body and a tool shank and the jaws clamping the latter to prevent the tapered shank under operating pressure from wedging the jaws against the cam surfaces with force sufficient to prevent hand operation of said member.

5. In a rotating chuck for tapered tool shanks, the combination with a chuck body having radial slots opening into a central aperture, of jaws shorter than and radially and axially movable in said slots, a spring pressed rotary and axially movable member surrounding the chuck body and operable by hand against the action of its spring while the chuck is rotating and having cam surfaces for operating the jaws to clamp a tool shank, and an abutment at the inner end of the central aperture for limiting relative axial movement of the chuck body and a tool shank and the jaws clamping the latter and the member operating the jaws to prevent the tapered shank under operating pressure from wedging the jaws against the cam surfaces with force sufficient to prevent hand operation of said member.

6. In a rotating chuck for tapered tool shanks, the combination with a spring pressed rotary member operable by hand against the action of its spring while the chuck is rotating and having cam surfaces for operating the jaws to clamp a tool shank, of a plurality of movable tapered jaws one edge of each of which contacts with the cam surfaces and the opposite edge of which is shaped to form an eccentric cam surface for gripping a tool shank by a rocking movement, and means for limiting relative axial movement of the chuck and the tool shank clamped therein to prevent the tapered shank under operating pressure from wedging the jaws against the cam surfaces with force sufficient to prevent hand operation of said member.

7. In a rotating chuck for tapered tool shanks, the combination with a spring pressed rotary member operable by hand against the action of its spring while the chuck is rotating and having cam surfaces for operating the jaws to clamp a tool shank, of a plurality of radially movable tapered jaws one edge of each of which contacts with the cam surfaces and the opposite edge of which is shaped to form an eccentric cam surface for gripping a tool shank by a rocking movement, and an abutment carried by the chuck for limiting relative axial movement of the chuck and a tool shank clamped therein and resting against the abutment to prevent the tapered shank under operating pressure from wedging the jaws against the cam surfaces with force sufficient to prevent hand operation of said member.

8. In a rotating chuck for tapered tool shanks, the combination with a spring pressed rotary member operable by hand against the action of its spring while the chuck is rotating and having cam surfaces for operating the jaws to clamp a tool shank, of a plurality of radially and axially movable tapered jaws one edge of each of which contacts with the cam surfaces and the opposite edge of which is shaped to form an eccentric cam surface for gripping a tool shank by a rocking movement, and an abutment carried by the chuck for limiting relative axial movement of the chuck and a tool shank and the jaws clamping the latter to prevent the tapered shank under operating pressure from wedging the jaws against the cam surfaces with force sufficient to prevent hand operation of said member.

9. In a rotating chuck for tapered tool shanks, the combination with a chuck body having radial slots opening into a central aperture, of a spring pressed rotary member surrounding the chuck body and operable by hand against the action of its spring while the chuck is rotating and having cam surfaces for operating the jaws to clamp a tool shank, a plurality of jaws shorter than and radially and axially movable in said slots one edge of each of which contacts with the cam surfaces and the opposite edge of which is shaped to form an eccentric cam surface for gripping a tool shank by a rocking movement, and an abutment at the inner end of the central aperture for limiting relative axial movement of the chuck body and a tool shank and the jaws clamping the latter to prevent the tapered shank under operating pressure from wedging the jaws against the cam surfaces with force sufficient to prevent hand operation of said member.

10. In a rotating chuck for tapered tool shanks, the combination with a chuck body having radial slots opening into a central aperture, of a spring pressed rotary and axially movable member surrounding the chuck body and operable by hand against the action of its spring while the chuck is rotating and having cam surfaces for operating the jaws to clamp a tool shank, a plurality of jaws shorter than and radially and axially movable in said slots one edge of each of which contacts with the cam surfaces and the opposite edge of which is shaped to form an eccentric cam surface for gripping a tool shank by a rocking movement, and an abutment at the inner end of the central aperture for limiting relative axial movement of the chuck body and a tool shank and the jaws clamping the latter and the member operating the jaws to prevent the tapered shank under operating pressure from wedging the jaws against the cam surfaces with force sufficient to prevent hand operation of said member.

11. In a chuck, the combination with a body having a radial slot opening into a central aperture, of a jaw mounted to rock within the slot, means for moving the jaw inwardly through the slot into contact with the tool shank in the aperture the inner edge of the jaw being provided with an eccentric cam surface adapted to engage a tool shank in the aperture and to be rocked within the slot by the tool shank to firmly grip said shank, and means for rocking the jaw in a reverse direction to return it to its normal position after a tool shank has been released.

12. In a chuck, the combination with a body having a radial slot opening into a central aperture, of a jaw mounted to rock within the slot, means for moving the jaw inwardly through the slot into contact with the tool shank in the aperture the inner edge of the jaw being provided with an eccentric cam surface adapted to engage a tool shank in the aperture and to be rocked within the slot by the tool shank to firmly grip said shank, and a spring for rocking the jaw in a reverse direction to return it to its normal position after a tool shank has been released.

In testimony whereof, I have signed my name to this specification in the presence of two subscribing witnesses.

VERNER J. WAHLSTROM.

Witnesses:
SYDNEY I. PRESCOTT,
ELIZABETH L. RUSSELL.